Patented May 29, 1951

2,554,482

UNITED STATES PATENT OFFICE 2,554,482

PREPARATION OF CYANOALKENES

Northrop Brown, Wilmington, Del., assignor to E. I. du Pont de Nemours and Company, Wilmington, Del., a corporation of Delaware No Drawing. Application June 17, 1950, Serial No. 168,840

6 Claims. (Cl. 260—465.9)

This invention relates to a novel process for manufacturing cyanoalkenes. More particularly, this invention is directed to a process for preparing acrylonitrile and methacrylonitrile by oxidation of propionitrile and isobutyronitrile respectively.

For many years it has been known that acrylonitrile can be prepared by dehydrogenating propionitrile in the presence of such catalysts as metals of groups II to VII of the periodic table, magnesium oxide, zinc oxide, aluminum oxide, titanium oxide, vanadium oxide, chromium oxide, molybdenum oxide, manganese oxide, and the sulfates, silicates, and phosphates of these metals or mixtures of these catalysts, as well as combinations of such catalysts with supports such as silicia gel, pumice, and decolorizing clays. Instead of the oxides, compounds which give rise to the formation of these oxides under the reaction conditions, such as the hydroxides and carbonates, also have been known to be active catalysts for the dehydrogenation of saturated nitriles. It was also known that this process could be carried out at reduced pressures, and that the effects of reducing the pressure could also be realized by employing a carrier gas such as a volatile hydrocarbon, acetonitrile, nitrogen, trace quantities of air, or carbon dioxide. Carbon dioxide was known to have a specific beneficial effect upon the process by preventing the formation of carbon on the surface of the catalyst. These disclosures are found in French Patent 790,262 (délivré September 2, 1935). More recently (in U. S. Patent 2,385,552) it has been disclosed that greatly increased yields of unsaturated nitriles can be obtained by dehydrogenation of saturated nitriles by the use of a catalyst comprising the dark vitreous oxides of a metal from the group consisting of chromium and vanadium. With these specific catalysts yields as high as 85% were reported at conversions of about 30%. It has also been reported that, in the dehydrogenation of propionitrile, pyrolysis to HCN can be avoided by employing tungsten sulfide and a minor proportion of nickel sulfide as catalyst (U. S. 2,452,505).

In general, the available processes for dehydrogenating saturated nitriles have had the serious disadvantage that the activity of the catalyst decreases fairly rapidly after a few hours of operation, so that the high yields which are initially obtainable cannot be maintained for sufficiently long periods of time to make the said processes economically attractive. An even more serious disadvantage from the standpoint of the manufacture of acryonitrile or methacrylonitrile on a large scale has been the high requirement for heat input, which limited the size of the equipment which could be employed satisfactorily. Another serious inherent disadvantage in the aforesaid processes has been the limitation on conversion which is imposed by thermodynamic considerations; the dehydrogenation is unfavorable thermodynamically except at very high temperatures, and as a result at the lower temperatures within the operable range the conversion is limited to about 25% to 35%. Even when these maximum conversions are obtained the activity of the catalyst falls off too rapidly.

An object of this invention is to overcome the aforesaid disadvantages of the previously known processes for preparing unsaturated nitriles from saturated nitriles. A more specific object of the invention is to provide an economically feasible process for converting propionitrile to acrylonitrile. A still further object of the invention is to provide a process for making acrylonitrile in high yield and of sufficiently high quality to permit use thereof in the manufacture of polyacrylonitrile textiles. These objectives are attained by the process set forth hereinafter.

It has been discovered in accordance with this invention that unsaturated nitriles, e. g. cyanoalkenes, can be prepared by oxidation of saturated nitriles (e. g. cyanoalkanes) in the presence of iodine. In the novel method of the present invention, the unsaturated nitrile is formed primarily by oxidation of the saturated nitrile, i. e. the chief source of the unsaturated nitrile is the reaction involving reaction of oxygen with the saturated nitrile. It has also been discovered in accordance with this invention that compounds of the formula $H_2C=CRCN$, R being a member of the class consisting of hydrogen and methyl groups, can be prepared by oxidizing compounds of the formula $CH_3CHRCN$ with from 0.1 to 2.0 mols of free oxygen per mol of nitrile at a temperature within the range of 250° to 900° C., preferably about 400° to 800° C. in the presence of iodine. Temperatures as high as 1000° C. or higher may be employed if the space velocity as very high.

One of the chief advantages of the present invention is that it does not require the use of catalysts which become poisoned rapidly during the course of the reaction. This eliminates one of the major difficulties with the previously known processes for converting saturated nitriles to unsaturated nitriles. Another very important advantage lies in the elimination of the need for supplying heat to compensate for the endothermicity of the dehydrogenation reaction. Furthermore, the oxidation of saturated nitriles to unsaturated nitriles is much more favorable from a thermodynamic standpoint than is the previously known dehydrogenation reaction, and accordingly much higher conversions can be obtained at relatively lower temperatures than in the previously known process.

The use of iodine as catalyst tends to prevent oxidation of the saturated nitrile to oxides of carbon while at the same time favoring the oxidation of the saturated nitrile to the unsaturated nitrile. In this respect it is superior to other catalysts for the oxidation reaction.

The saurated nitrile which is employed in the practice of the invention may be produced in situ by thermal or catalytic dehydration of propionamide or isobutyramide, but it is generally preferred to introduce the saturated nitrile into the reaction vessel as such. An excellent way of carrying out the oxidation is to introduce a mixture of the nitrile and corresponding amide, whereby a mixture of the saturated nitrile (which can be recycled) and the desired unsaturated nitrile is obtained.

The invention may be illustrated further by means of the following examples:

*Example 1.*—Propionitrile containing 2% by weight of iodine was passed through a Vycor tube with air (mol ratio of propionitrile:oxygen= 1:0.4) at a total space velocity of 600, the maximum temperature being 610° C. Analysis of the effluent (given in detail below) showed that 30% of the propionitrile had been converted, 86% of the converted propionitrile going to acrylonitrile, 3% to acetonitrile and 6% to HCN, the remainder going to nitrogen and miscellaneous products. The oxidation, which was exothermic, was continued for 16¾ hours without any diminution in yield or conversion. During this time 15.0 mols of propionitrile were charged, and the volume of off-gas, collected after condensation of the liquid product, was 606.9 liters. This off-gas analyzed as follows (mol percentages): propionitrile, 0.1; acrylonitrile, 0.1; CO, 2.7; $CO_2$, 0.3; $H_2$, less than 0.04; $CH_4$, 0.95; $C_2H_4$, 0.35; $C_2H_6$, 0.20; $N_2$, 84.2; A, 1.0; $O_2$, 10.1. The liquid product (weight, 833.5 grams), which was analyzed by the mass spectrometer, contained the following ingredients (weight per cent): propionitrile, 69.5; acrylonitrile, 24.5; acetonitrile, 0.74; HCN, 0.81; $H_2O$, 3.98; $CH_3OH$, 0.19; HCOOH, 0.18. The iodine was present in the product as one of the relatively non-volatile ingredients of the liquid condensate.

*Example 2.*—Propionitrile containing 2% by weight of iodine was passed through a Vycor tube with air (mol ratio of propionitrile:oxygen= 1:0.1) at a total space velocity of 600, the maximum temperature being 650° C. Conversion of propionitrile was 9%. The experiment was repeated, using a propionitrile:oxygen ratio of 1:0.6. Conversion of propionitrile was 25%. In each instance, the yield of acrylonitrile, based on propionitrile converted, remained 84±5%. At a propionitrile:oxygen ratio of 1:0.3, the yield of acrylonitrile, based on propionitrile converted, was 92%, with a 17% conversion of propionitrile. There was no diminution in yield or conversion as the reaction progressed.

*Example 3.*—Propionitrile containing 2% by weight of iodine was passed through a Vycor tube with air (mol ratio of propionitrile:oxygen= 1:0.42) at a total space velocity of 350, the maximum temperature being 750° C. Analysis of the effluent showed that 76% of the propionitrile had been converted, 67% of the converted propionitrile going to acrylonitrile, 11% to acetonitrile, 17% to HCN, 0.7% to methacrylonitrile, less than 0.1% to n-butyronitrile, the remainder going to nitrogen and miscellaneous products.

*Example 4.*—Isobutyronitrile containing 2% by weight of iodine is passed through a quartz tube with air (mol ratio of propionitrile:oxygen=1:1) at a temperature of 630° C. (total space velocity, 850); the yield of methacrylonitrile is 80 to 85%, and the total conversion of isobutyronitrile is about 25%.

*Example 5.*—Adiponitrile containing 2% of iodine is passed through a quartz tube with air (mol ratio adiponitrile:$O_2$=1:0.5) at 500° C. The resulting product is a mixture of water and cyanoalkenes.

It is to be understood that the foregoing examples are illustrative only, and that the invention is not limited thereto. Any convenient method may be employed for separating the products obtained in the practice of the invention. Since water is invariably one of the products it may be removed by azeotropic distillation or by the use of a dehydrating agent. The acrylonitrile or methacrylonitrile fraction is readily obtainable by distillation of the product after dehydration. The impurities, which may also be removed by distillation, include small amounts of acetonitrile.

In a series of runs somewhat similar to the experiment recorded above in Example 2 the quantity of iodine catalyst present was varied as follows: 0.0%, 0.1%, 1.0%, 1.5%, and 3.0% (percentage of iodine by weight introduced with the propionitrile); this series showed that the effect of increasing the quantity of the iodine catalyst was to increase the selectivity of the oxidation of propionitrile to acrylonitrile. In another similar series of tests the effect of varying the quantity of air, over a range of $O_2$:propionitrile mol ratio of 0.11 to 0.73 was determined; it was found that optimum yields of acrylonitrile were achieved when this ratio was about 0.33.

It has been found that n-butyronitrile, isobutyronitrile and methacrylonitrile are apparently also formed in trace amounts during the oxidation of propionitrile by the method herein disclosed. The mechanism whereby these byproducts may be formed is not necessarily understood. Also, in the oxidation of isobutyronitrile one of the products is acrylonitrile, which may be formed by a demethanation mechanism.

Inert diluents such as nitrogen, carbon dioxide, etc. may be present during the oxidation if desired. Accordingly the oxygen may be introduced into the reaction vessel in the form of oxygen-nitrogen mixtures, such as air, oxygen-carbon dioxide mixtures, or pure oxygen. A suitable preferred quantity of oxygen is about 0.2 to 1.0 mol per mol of saturated nitrile charged; a relatively small amount is somewhat preferable if no inert diluent gas is present. The oxygen may be introduced at more than one point along the reaction vessel if desired, thus eliminating a large excess thereof near the inlet of the reaction vessel.

In general, when iodine is employed as a catalyst the reaction mixture can be collected by cooling the effluent gases whereby the acrylonitrile and catalyst condense. The acrylonitrile can be recovered from the condensed mixture by distillation, whereby a residue containing virtually all of the iodine (partly in a combined state) is obtained. The resulting mixture (containing iodine) can be recycled and is found to be an efficient catalyst for the oxidation reaction. By concentration of the distillation residue a sand-like polymeric precipitate is formed which is insoluble in propionitrile; it is usually preferred to avoid excesssive formation of this material by recycling the distillation residue prior to the formation of excessive amounts of precipitate. Thus, recycling of the recovered catalyst can be continued repeatedly without any appreciable loss of effective catalyst.

The only limitations which should be imposed are those which are indicated in the following claims.

I claim:

1. The method for preparing a cyanoalkene wherein the said cyanoalkene is produced by oxidizing a cyanoalkane in the vapor phase with molecular oxygen in the presence of iodine.

2. The method for preparing acrylonitrile by oxidizing propionitrile with oxygen in the presence of iodine as a catalyst.

3. The method of claim 2 in which the temperature is within the range of 250° to 900° C.

4. A process for preparing a compound of the formula $H_2C=CRCN$, R being a member of the class consisting of hydrogen and methyl groups, which comprises heating a compound of the formula $CH_3CHRCN$ with molecular oxygen in the presence of iodine at a temperature within the range of 250° to 900° C., the mol proportion of oxygen to the compound of the formula $CH_3CHRCN$ being from 0.1 to 2.0, whereby oxidation of the said compound of the formula $CH_3CHRCN$ occurs, and withdrawing from the reaction zone a gaseous mixture comprising water formed by the said oxidative dehydrogenation and a compound of the formula $H_2C=CRCN$.

5. A process for preparing a compound of the formula $H_2C=CRCN$, R being a member of the class consisting of hydrogen and methyl groups, which comprises heating a compound of the formula $CH_3CHRCN$ with molecular oxygen in the presence of iodine at a temperature within the range of 400° to 800° C., the molar ratio of oxygen to the compound of the formula $CH_3CHRCN$ being from 0.2 to 1.0, whereby oxidation of the said compound of the formula $CH_3CHRCN$ occurs with the production of compound of the formula $H_2C=CRCN$, and thereafter separating the said compound of the formula $H_2C=CRCN$ from the resulting mixture.

6. A process for preparing a compound of the formula $H_2C=CRCN$, R being a member of the class consisting of hydrogen and methyl groups which comprises heating a compound of the formula $CH_3CHRCN$ with molecular oxygen at a temperature within the range of 400° to 800° C., the molar ratio of oxygen to the compound of the formula $CH_3CHRCN$ being from 0.1 to 2.0, whereby oxidation of the said compound of the formula $CH_3CHRCN$ occurs in the presence of iodine as a catalyst with the production of a compound of the formula $H_2C=CRCN$, thereafter condensing the resulting mixture by cooling the same, distilling from the condensed mixture the compound of the formula $H_2C=CRCN$ and repeating the process by recycling the resulting distillation residue through the reaction vessel at the said temperature with an additional quantity of the compound of the formula $CH_3CHRCN$.

NORTHROP BROWN.

REFERENCES CITED

The following references are of record in the file of this patent:

UNITED STATES PATENTS

| Number | Name | Date |
| --- | --- | --- |
| 2,384,737 | Haas | Sept. 11, 1945 |
| 2,385,552 | Spence et al. | Sept. 25, 1945 |
| 2,412,437 | Wagner | Dec. 10, 1946 |
| 2,445,693 | Porter et al. | July 20, 1948 |
| 2,452,505 | Teter | Oct. 26, 1948 |
| 2,481,826 | Cosby | Sept. 13, 1949 |
| 2,499,055 | Cosby et al. | Feb. 28, 1950 |

FOREIGN PATENTS

| Number | Country | Date |
| --- | --- | --- |
| 790,262 | France | Nov. 16, 1935 |